United States Patent

Jeong et al.

[11] Patent Number: 6,104,439
[45] Date of Patent: *Aug. 15, 2000

[54] METHOD AND APPARATUS FOR MOTION ESTIMATION

[75] Inventors: Jechang Jeong, Seoul; Wooyoun Ahn, Suwon; Byeungwoo Jeon, Sungnam, all of Rep. of Korea

[73] Assignee: Samsung Electronics Co., Ltd., Kyungki-Do, Rep. of Korea

[*] Notice: This patent is subject to a terminal disclaimer.

[21] Appl. No.: 08/547,011

[22] Filed: Oct. 23, 1995

Related U.S. Application Data

[63] Continuation-in-part of application No. 08/129,081, Nov. 30, 1993, Pat. No. 5,489,949.

[30] Foreign Application Priority Data

Feb. 8, 1992 [KR] Rep. of Korea ............. 92-1845

[51] Int. Cl.[7] ............................................. H04N 7/36
[52] U.S. Cl. ............................................. 348/699
[58] Field of Search .................. 348/699, 402, 348/413, 416; H04N 7/36, 7/13

[56] References Cited

U.S. PATENT DOCUMENTS

| | | | |
|---|---|---|---|
| 4,720,780 | 1/1988 | Dolecek | 370/428 |
| 4,937,666 | 6/1990 | Yang | 348/413 |
| 4,989,087 | 1/1991 | Pele | 348/416 |
| 5,241,608 | 8/1993 | Fogel | 348/699 |
| 5,280,351 | 1/1994 | Wilkinson | 348/699 |
| 5,289,274 | 2/1994 | Kondo | 348/699 |
| 5,489,949 | 2/1996 | Jeong | 348/699 |

FOREIGN PATENT DOCUMENTS

| | | |
|---|---|---|
| 0 468 279 A2 | 1/1992 | European Pat. Off. . |
| 0 508 706 A1 | 10/1992 | European Pat. Off. . |
| 4-314290 | 11/1992 | Japan . |
| 5-236452 | 9/1993 | Japan . |
| 2 257 326 | 1/1993 | United Kingdom . |

OTHER PUBLICATIONS

Electronic Image Stabilization System for Video Cameras and VCRs, SMPTE Journal, Feb. 1992, No. 2, pp. 66–76.
Technical Details (AT&T) (Digital Specatrum Compatible), Sep. 23, 1991, pp. 11–16.

*Primary Examiner*—Howard Britton
*Attorney, Agent, or Firm*—Sughrue, Mion, Zinn, Macpeak & Seas, PLLC

[57] ABSTRACT

A method for motion estimation includes steps for constructing a first image segment representing a portion of present image frame and a second image segment having a plurality of image segments of an adjacent frame, comparing said plurality of image segments of said second image segment with the image signal within the first image segment, and generating a number of error values, detecting a first motion vector at one scale of resolution using the generated error values, outputting the error value associated with a reference segment pointed by the first motion vector, and the error values corresponding to the reference segment shifted by one unit of selected resolution respectively in selected direction(s), generating a second motion vector in finer scale of resolution using the output error values, and summing the first and second motion vectors.

25 Claims, 6 Drawing Sheets

(a)

(b)

METHOD AND APPARATUS FOR MOTION ESTIMATION

This application is a continuation-in-part of application Ser. No. 08/129,081 filed Nov. 30, 1993, now U.S. Pat. No. 5,489,949.

FIELD OF THE INVENTION

The present invention relates to a method and apparatus for performing motion estimation and, more particularly relates to a method and apparatus for extremely detailed motion estimation which, for an estimation of motion vector (s) at a scale of finer resolution, uses error values generated at an estimation of motion vector(s), at a scale of lower resolution especially motion compensated differential pulse code pulse code modulation (DPCM) method for coding a digital image signal.

DESCRIPTION OF RELATED ART

Generally, there are several coding methods for further efficiently compressing transmission data in an image signal processing apparatus using subsequent digital image signals, such as high definition television (HDTV), Digital VTR (digital video tape recorder), and multi-media, etc. The DPCM method codes the digital image signal using data correlations which are present between adjacent frames of the image signal.

In the case of coding a difference signal between adjacent frames representing different times using the DPCM method, it is disadvantageous that much more data needs to be coded for an active image than for a still image. However, by recognizing a movement location from a certain segment of an adjacent frame to a specific segment in the present frame, that is, the best similarity between a specific image of the present frame and a certain image of the adjacent frame, efficient data compression can be performed because signal difference values of similar segments between frames can be minimized after motion compensation. Accordingly, in the motion-compensated DPCM method, difference data between a predetermined image segment of the present frame and the corresponding image segment of the adjacent frame is coded, thereby permitting efficiency of the transmission to be enhanced. In the motion estimation method, a motion vector represents a moving direction and magnitude of the image segment obtained by comparing an image segment of the present frame with the corresponding image segment of an adjacent frame.

There are several methods for generating motion estimates in terms of a pixel unit. Generally, since motion between two frames separated in time may be small with respect to an integer-pixel unit, errors may be introduced during motion compensation when using the motion vector of an integer-pixel unit. Therefore, a motion vector of a sub-pixel unit is used for reducing motion compensation errors. A half-pixel unit, as one estimation method of sub-pixel units, is commonly used for the motion estimation. A motion estimation method using a half-pixel unit in accordance with a conventional method will be briefly described.

The apparatus of FIG. 1 comprises image segment constructor 1 for receiving an image signal of the present frame and constructing an image segment composed of a plurality of pixels; search range constructor 2 for receiving the image signal of an adjacent frame and constructing the image segment composed of a plurality of pixels; a first search unit 3 for receiving the image signals output from the image segment constructor 1 and the search range constructor 2 and detecting a first motion vector MV1 of a pixel unit; a half-pixel interpolating unit 4 for receiving image signals output from the search range constructor 2 and the first search unit 3 and calculating image signal values in half-pixel locations around reference pixels, using the image segment, which will be referred to as a reference segment, within the adjacent frame which is determined by the first motion vector MV1 detected from the first search unit 3 and its surrounding pixels; a second search unit 5 for receiving the image signals output from the image segment constructor 1 and the half-pixel interpolating unit 4 and outputting a second motion vector MV2 of a half-pixel unit; and a summing unit 6 for receiving and summing the output signals MV1, MV2 from the first search unit 3 and the second search unit 5, respectively, and outputting a motion vector MV.

The image segment constructor 1 receives the image signal of the present frame and stores the input signal in segments. Simultaneous with inputting the image signal of the present frame, the search range constructor 2 receives the image signal from an adjacent frame and constructs a search range segment. The first search unit 3 searches for a segment within the search range segment which best matches the segment in the present frame. By comparing data in a pixel unit between two segments, the first motion vector MV1 of an integer-pixel unit generated from the first search unit 3 is output to the summing unit 6 and the half-pixel interpolating unit 4. The half-pixel interpolating unit 4 linearly interpolates out the reference pixels of a designated segment within the adjacent frame using the first motion vector MV1 of an integer-pixel unit and the surrounding pixels, and then outputs the calculated values to the second search unit 5.

In the above conventional system, the image segment may be a $N_1 \times N_2$ block type composed of $N_1 \times N_2$ pixels. Additionally, the search range may be composed of $M_1 \times M_2$ pixels. Alternately, the image segments and the search range may be constructed in accordance with the shape and size of the objects within the range. Furthermore, in the case of a uni-directional prediction which requires one adjacent frame for reference as in a P-frame in MPEG or in B-frame that involves only backward prediction, the image segment of the present frame is compared with an image segment within the range search constructed either within the previous or future frame. However the motion estimation previously mentioned is also applicable to the bi-directional prediction which involves both previous and future frames. In the case of a bi-directional predictions as in B-frame in MPEG, the image segment of the present frame is compared with an image segments within the search ranges constructed within the previous frame and the future frame.

Another conventional method for constructing the image segment and the search range is accomplished in accordance with the objects within the image. Thus, constructed image segment and the search range segment may be of any size and shape.

In FIG. 2, "O" illustrates pixel unit intervals and "x" indicates half-pixel unit intervals. The second unit 5 moves the image segment of an adjacent frame corresponding to the first motion vector MV1 of an integer-pixel unit to every direction in half-pixel units, respectively, searches for a location having a minimum motion compensation error among locations x for the obtained eight half-pixel motion vectors and the first motion vector MV1, and outputs one of vector components (−½, 0, ½), that is, a minutely controlled value in a half-pixel unit. The summing unit 6 sums the first motion vector MV1 in integer-pixel units output from the first search unit 3 and the second motion vector MV2 in half-pixel units from the second search unit 5, to thereby generate a complete motion vector MV for the motion estimation. For example, the summing unit 6 sums the horizontal component (−½) of the second motion vector MV2 of a half-pixel unit from the second search unit 5 with the motion vector (MV1=(x, y)) of a pixel unit from the first search unit 3, and then determines the motion vector (MV= (x−½, y)).

In case of bi-directional motion estimation, which involves previous and future adjacent frames, the same procedure is applied both to forward and backward predictions.

The above-described conventional method determines the location of segment using the motion vector of a pixel interval unit, linearly interpolates out corresponding pixel values at half-pixel locations using the determined segment and surrounding pixels of the segment. The method uses the interpolated half-pixel values and the segment values of the present frame determined by the motion vector in integer-pixel units, and selects the most similar segment among eight half-pixel motion positions, that is, "x" of FIG. 2. Accordingly, the conventional method has a drawback in that it takes too long in processing data for estimating the motion vector in half-pixel units. This drawback is not confined to the case of motion vector estimation at half-pixel unit, but a general problem for a motion vector estimation at a resolution finer than a pixel unit.

SUMMARY OF THE INVENTION

In order to solve the above-identified problem, an object of the present invention is to provide a method for motion estimation which makes efficient compensation of extremely detailed motion possible, wherein error values at one scale of resolution are used for estimation of motion vectors at a more detailed scale of resolution, comparing error values generated as a result of comparing data between predetermined image segment within the search range to detect the motion vector at one scale of resolution and estimating the motion vector at finer resolution.

Another object of the present invention is to provide an apparatus for motion estimation making efficient compensation of extremely detailed motion possible, by employing error values used for estimation of motion vectors between frames, by generating error values corresponding to one-scale of resolution by comparing data between predetermined image segment within the present image segments with the adjacent frame(s), comparing generated errors, and estimating the motion vector at a finer scale.

These and other objects, features and advantages according to the present invention are accomplished by a method for comparing an image signal between adjacent frames and estimating motions of the image. The method comprises the steps of constructing a first image segment representing an image signal of a portion of present image frame and a second image segment which has the image signal of an adjacent frame and which will be referred to as a search range segment, comparing the image signal of a plurality of image segments which are present within the search range segment with the image signal within the first image segment, and generating a number of error values; outputting the error value associated with the segment pointed by the first motion vector which will be referred to as a reference segment, and the error values corresponding to the reference segment shifted by one unit of selected resolution respectively in selected direction(s); generating a second motion vector in a finer scale of resolution using the output error values; and summing the first and second motion vectors.

These and other objects, features and advantages according to the present invention are achieved by an apparatus for comparing an image signal between adjacent frames and estimating a motion of the image. The apparatus comprises means for receiving the image signal of a present frame and constructing a first image segment; means for receiving the image signal of an adjacent frame and constructing a second image segment; search means for receiving the image signal output respectively from the first image segment constructor and the second image segment constructor, detecting a first motion vector at one selected scale of resolution unit, comparing the image signals of surrounding image segments, which are generated by moving the reference image segment within the adjacent frame pointed by the detected first motion vector by one unit of the selected scale respectively in selected direction(s), and the reference image segment with the image signal of the first image segment, and outputting error values obtained as a result of respective comparisons; control means for receiving the errors output from the search means and generating a second motion vector having a resolution finer than the selected scale; and summing means receiving the first and second motion vectors, for adding and outputting them.

DETAILED DESCRIPTION OF THE PREFERRED EMBODIMENTS

Description is now made for a case in which a unit scale for a first motion vector and a finer scale for a second motion vector are selected to be a pixel unit resolution and half-pixel unit respectively. This example however, can be applied to any other selected scales.

A motion vector of a predetermined segment in a present frame corresponding to a segment in an adjacent frame is represented as MV=(x, y). Here, the motion vector MV has a horizontal component of motion vector x and a vertical component of motion vector y.

Figure 1:
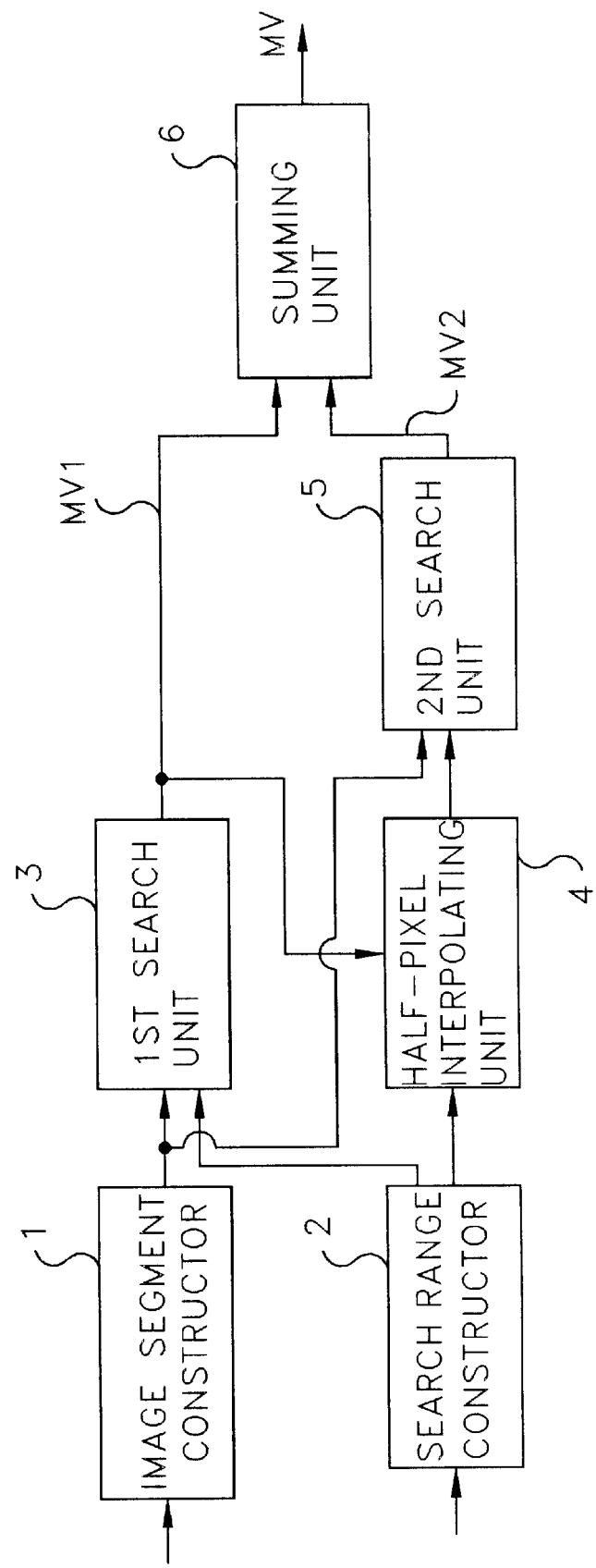
FIG. 1 is a block diagram for illustrating a conventional apparatus used for half-pixel motion estimation.
Figure 2:
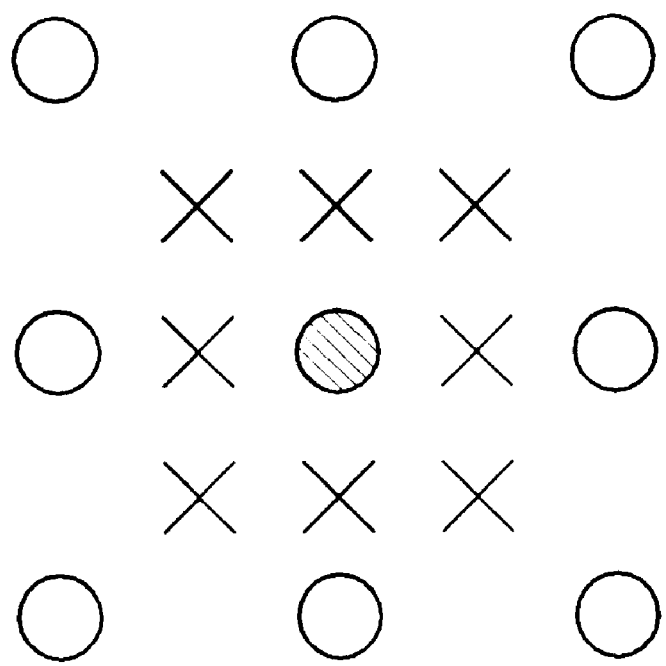
FIG. 2 is a conceptual diagram for showing a pixel unit and a half- pixel unit.
Figure 3A:
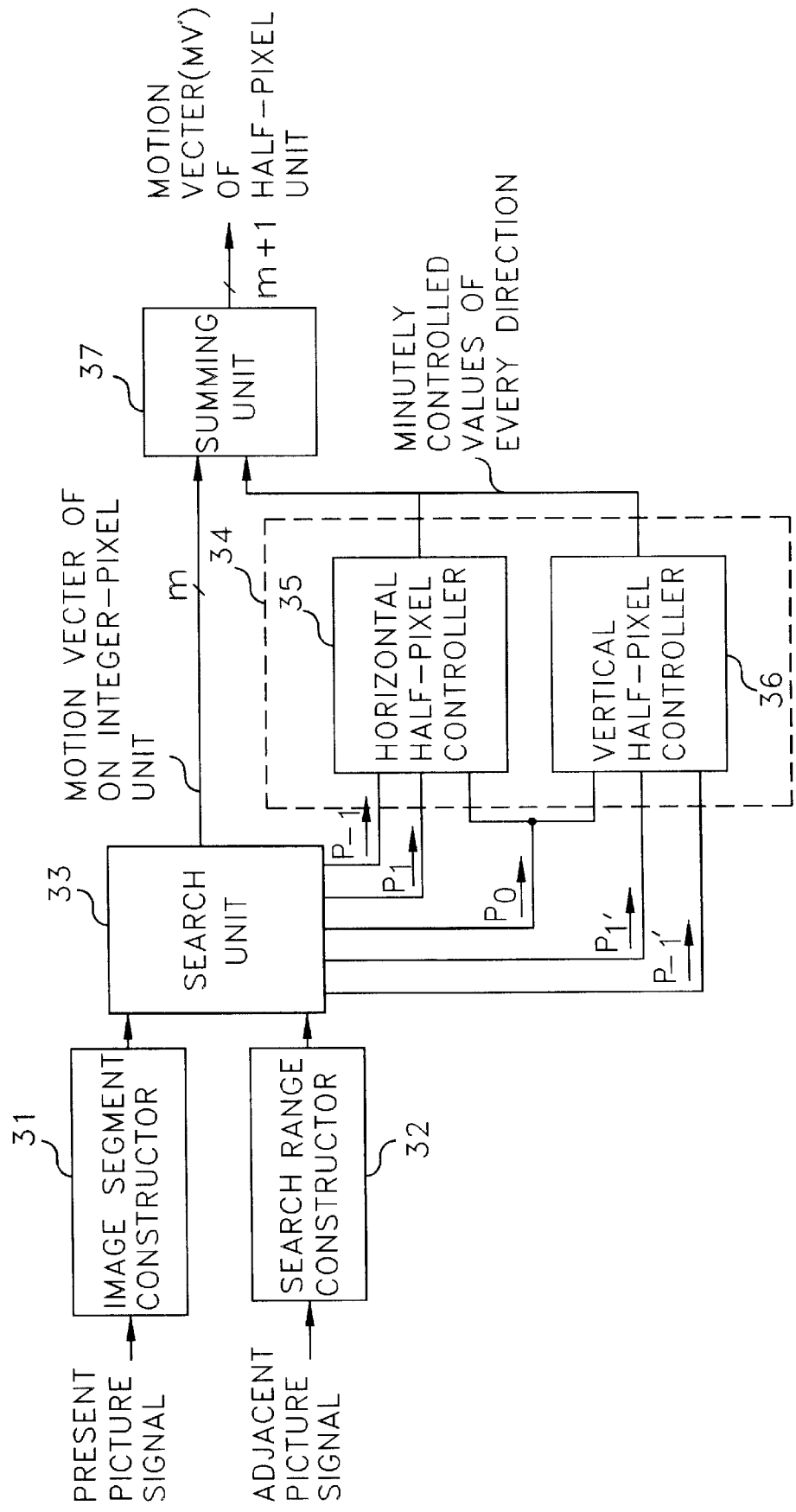
FIG. 3A is a block diagram illustrating an apparatus for performing motion estimation in accordance with a preferred embodiment of the present invention.

FIG. 3A is a block diagram illustrating an apparatus for motion estimation in accordance with a preferred embodiment of the present invention.

The apparatus of FIG. 3A comprises image segment constructor 31 for receiving an image signal of the present frame and constructing image segments composed of a plurality of pixels; search range constructor 32 for receiving the image signal of an adjacent frame and constructing image segments composed a plurality of pixels; search unit for receiving the image signals output from the image segment constructor 31 and the search range constructor 32, for detecting a first motion vector MV1 in pixel units by comparing image signals between image segments within the segment constructed by the search range constructor 32 and the image segment in the present frame, and outputting error values corresponding to an image pointed by the detected MV1, which will be called as a reference segment, and to image segments generated by moving the reference segment to horizontal and vertical directions by one pixel; half-pixel control means 34 for receiving the errors output from the search unit 33 and calculating a second motion vector MV2 in respective half-pixel interval vertically and horizontally; and summing unit 37 receiving the first motion vector MV1 from the search unit 33 and the second motion vector MV2 from the half-pixel control means 34, summing the respective vectors and outputting a resultant motion vector MV.

The half-pixel control means 34 includes a horizontal half-pixel controller 35 for detecting a horizontal component of the second motion vector MV2 and vertical half-pixel controller 36 for detecting a vertical component of the second motion vector MV2.

Figure 3B:
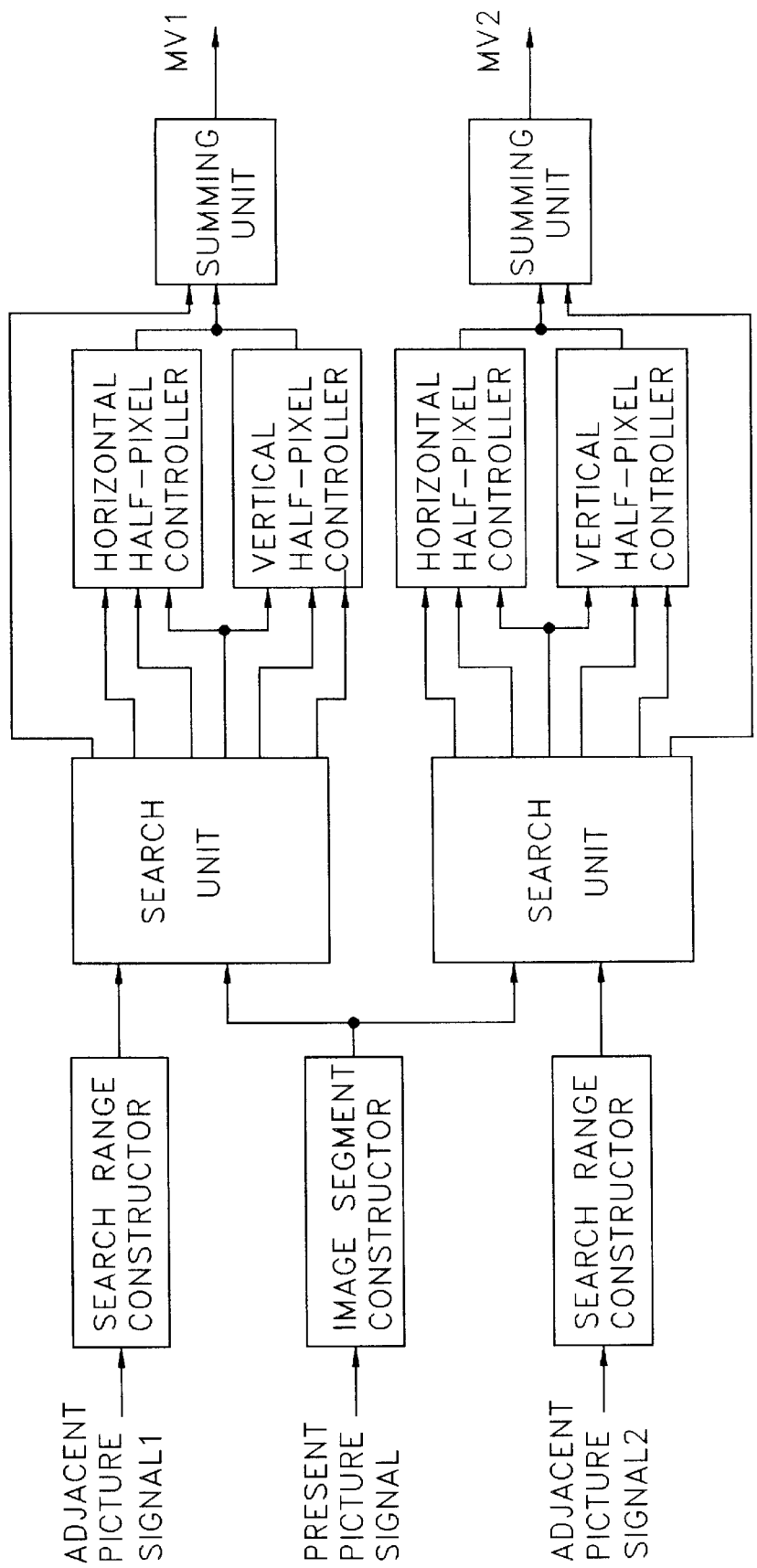
FIG. 3B is another example of a block diagram illustrating an apparatus for performing motion estimation in accordance with a preferred embodiment of the present invention.

Of the image signals for two adjacent frames separated in time, the image segment constructor 31 receives the image signal of the present frame and stores the input signal in a first segment. Simultaneously with inputting the image signal of the present frame, the search range constructor 32 receives the image signal of an adjacent frame and stores it in a second segment, which advantageously may be larger than the first segment. The search is unit 33 receives respectively the image signals of the stored second segment and the first segment output from the search range constructor 32 and the image segment constructor 31, respectively. In the case of a P-frame, the comparison is made between the present frame and a previous frame; however, in the case of a B-frame the comparison is made between the present frame and a future frame in addition to the comparison between the present frame and a previous frame. Thus, in the case of a B-frame, the search range constructor 32 constructs a second segment of a previous frame and a third segment of a future frame. Accordingly, the comparison between the present frame and the previous frame and then between the present frame and future frame or vice versa or the comparisons may occur simultaneously as shown in FIG. 3B.

The following is a description in which the first segment and the second segment has the form $N_1 \times N_2$ pixels and $M_1 \times M_2$ respectively. Furthermore, for the simplicity of explanation, an integer-pixel unit is selected as one scale of resolution. Note that the present invention can be applied to the cases with other selected scale resolutions as well.

A motion estimation error obtained by estimating the motion vector of an integer-pixel unit is represented by $P_0$, motion estimation errors which are generated by moving in horizontal and vertical direction by one pixel, respectively, on the basis of the estimated motion vector, are respectively $P_1'$, $P_{-1}'$, $P_{-1}$, and $P_1$. Mean absolute error MAE, or mean squared error MSE advantageously can be used for calculating motion estimation errors. Equations which preferably can be used to calculate the horizontal motion estimation errors ($P_0$, $P_1$, $P_{-1}$) by the MAE are as follows:

$$P_0 = \sum_{m=0}^{N-1} \sum_{n=0}^{N-1} |Y(Nk+m, Nl+n) - Y'(Nk+m+x, Nl+n+y)| \quad (1)$$

$$P_1 = \sum_{m=0}^{N-1} \sum_{n=0}^{N-1} |Y(Nk+m, Nl+n) - Y'(Nk+m+x+1, Nl+n+y)| \quad (2)$$

$$P_{-1} = \sum_{m=0}^{N-1} \sum_{n=0}^{N-1} |Y(Nk+m, Nl+n) - Y'(Nk+m+x-1, Nl+n+y)| \quad (3)$$

Where Y represents the image signal of the present frame, Y' represents that of the adjacent frame, and $N_1=N_2=N$ represent segment size. In the above equations, (k, l) represents position from the top left position of the frames. It will be appreciated that the vertical motion estimation errors ($P_1'$, $P_{-1}'$) can be calculated by the same method as noted by the above listed equation.

The search unit 33 compares, in pixel units, the data magnitude between the image segment of the present frame and a plurality of adjacent image segments, which are present within the search range of the adjacent frame and have similar sizes, and calculates motion estimation errors as a result of respective comparisons. The first motion vector MV1, in integer-pixel units is determined as a segment location where the motion estimation error is a minimum, and is output to the summing unit 37. The search unit 33 outputs to the half pixel control unit the motion estimation errors ($P_{-1}$, $P_1$, $P_0$, $P_{-1}'$, $P_1'$) corresponding to the reference image segment within an adjacent frame determined by the motion vector MV1 in integer-pixel units and a number of image segments surrounding the reference image segment and shifted by one pixel. Advantageously, the present invention simultaneously and individually determines the horizontal and vertical components of motion vector in half-pixel units. However, since the horizontal half-pixel controller 35 and the vertical half-pixel controller 36 use the same methodology, description will be limited to a method for determining the horizontal component of a motion vector in half-pixel units.

In the case of the unidirectional motion prediction, a single set of motion estimation errors ($P_{-1}$, $P_1$, $P_0$, $P_{-1}'$, $P_1'$) resulting from comparison of the present frame and adjacent frame is output from the search unit 33 to the half-pixel control means 34 as described above; however, the same argument can be made to the bi-directional motion prediction as in B-frame, two sets of motion errors, one set resulting from comparison of the present frame and a previous frame and another set resulting from comparing present frame and a future frame, are output from search unit 33 to the half-pixel control unit 34.

FIG. 3B is similar to FIG. 3A except that two adjacent frames are simultaneously input to the system. In the case of a B-frame, a future frame and a previous frame are simultaneously input to the system.

Figure 4:
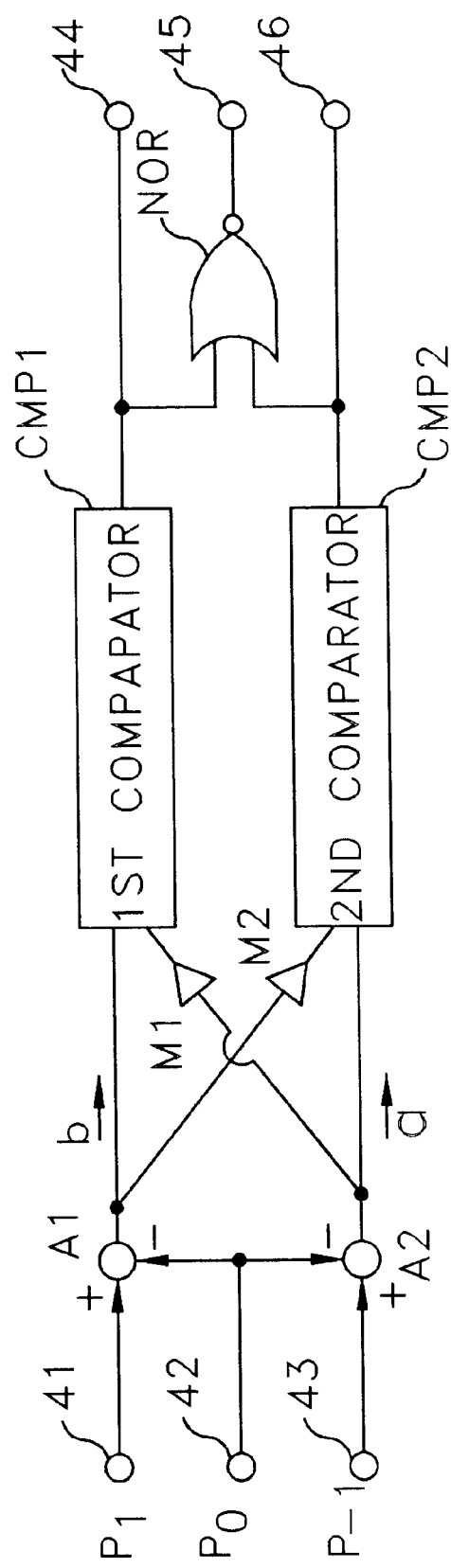
FIG. 4 is a detailed block diagram illustrating a horizontal half-pixel controller of FIGS. 3A–3B.

FIG. 4 is a detailed block diagram illustrating the horizontal half-pixel controller of FIGS. 3A and 3B.

The device of FIG. 4 includes three input terminals 41, 42, 43 for receiving the motion estimation errors ($P_1$, $P_0$, $P_{-1}$); a first adder A1 for adding and outputting the input signal $P_1$ of a first input terminal 41 and the input signal $P_0$ of a second input terminal 42; a second adder A2 for adding and outputting the input signal $P_0$ of the second input terminal 42 and the input signal $P_{-1}$ of a third input terminal 43; a first comparator CMP1, having a predetermined input terminal coupled to an output terminal of the first adder A1, for comparing respective input signals; a second comparator CMP2, having a predetermined input terminal coupled to an output terminal of the second adder A2, for comparing respective input signals; a second multiplier M2 for multiplying the output signal of the first adder A1 by a predetermined coefficient and outputting a multiplied value to the second comparator CMP2; a first multiplier M1 for multiplying the output signal of the second adder A2 by a predetermined coefficient and outputting a multiplied value to the first comparator CMP1; and a NOR gate NOR for performing a logical NOT OR function or respective output signals from the comparators CMP1, CMP2. The device further comprises three output terminals 44, 45, 46 to distinguish each of the output signals from first comparator CMP1, NOR gate NOR and second comparator CMP2.

The motion estimation errors ($P_1$, $P_0$, $P_{-1}$,) output from the search unit 33 are input to the horizontal half-pixel controller 35 of the half-pixel control means 34. Then, the first adder Al subtracts the signal $P_0$ input through the second terminal 42 input from the input signal $P_1$ through the input first terminal 41. The second adder A2 subtracts the signal $P_0$ input through the second input terminal 42 from the signal $P_{-1}$ input through the third input terminal 43. The first and second multipliers M1, M2 multiply by respective predetermined coefficients of the adder output signals and output the multiplied result to the comparators CMP1, CMP2, connected to the output of the multipliers, respectively. Advantageously, a difference value (a) between $P_0$ and $P_{-1}$ and (b) between $P_0$ and $P_1$ are respectively input to the second comparator CMP2 and the first comparator CMP1. Preferably, the first comparator CMP1 compares and outputs the output signals from the first adder A1 and the first multiplier M1. The second comparator CMP2 compares and outputs the output signals from the second adder A2 and the second multiplier M2.

Figure 5:
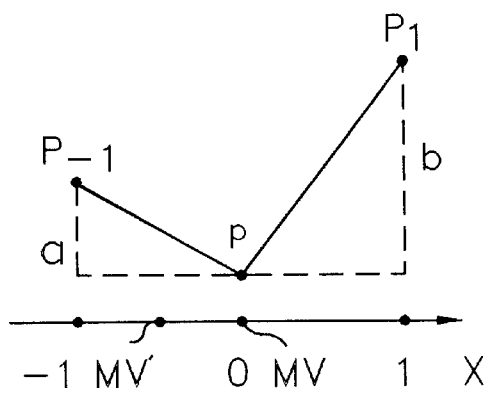
FIGS. 5(*a*) and (*b*) are conceptual diagrams showing a method for determining motion vectors of a half-pixel unit in the horizontal half-pixel controller.
Figure 5:
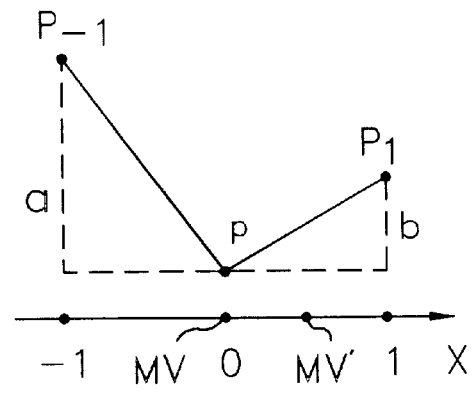

FIGS. 5(a) and 5(b) are conceptual diagrams showing a method for determining motion vectors in half-pixel units in the horizontal half-pixel controller 35. FIG. 5(a) shows that the motion vector MV2 of a half-pixel unit is present at the left with respect to the motion vector MV1 of a pixel unit, and FIG. 5(b) shows that the motion vector MV of a half-pixel unit is present at the right with the motion vector MV1 of a pixel unit.

In FIG. 5(a), when $P_1$ is larger than $P_{-1}$ (that is, b is larger than a) indicates that the motion vector MV is located about ½ the distance from the first motion vector MV1 in pixel units to the left. In FIG. 5(b), when $P_{-1}$ is larger than $P_1$ on the basis of $P_0$ (that is, a is larger than b) indicates that the motion vector MV is located about ½ way from the first motion vector MV1, in pixel units to the right.

In FIG. 5(a), for the case where $P_1$ is larger than $P_{-1}$ on the basis of $P_0$, only the output 44 of the first comparator CMP1 is "high". Thus, the horizontal half-pixel controller 35 outputs "–½", as the horizontal component value of the second motion vector MV2. In FIG. 5(b), for the case where $P_{-1}$ is larger than $P_1$ on the basis of $P_0$, only the output 46 of the second comparator CMP2 is "high". Thus, the horizontal half-pixel controller 35 outputs "½" as the horizontal component value of the second motion vector MV2. Where $P_1$ and $P_{-1}$, on the basis of $P_0$, are equal to each other, the output signals of the two comparators CMP1, CMP2 are both "low". Therefore, the NOR gate NOR receives low values and its output signal becomes "high". Accordingly, the horizontal component of the second motion vector MV2 becomes "O".

The summing unit 37 receives the second motion vector MV2 and adds it to the first motion vector MV1, in pixel units, obtained by the search unit 33, thereby estimating the second motion vector MV2 in half-pixel units.

It will be appreciated that a method and an apparatus for motion estimation in accordance with the present invention compares image signals of segments within as adjacent with the selected segment in a present frame to detect a motion vector at a selected scale of resolution; generates error values calculated in the detection of the motion vectors according to the selected vector.

By vertically comparing the generated error values, a vertical component of the motion vector in the finer scale of resolution is detected. By horizontally comparing the generated error values, a horizontal component of the motion vector in the finer scale of resolution is detected. Accordingly, the present invention leads to a greater efficiency in motion estimation by reducing the amount of data which must be processed for the detection of the motion vector in finer scale of resolution.

Although the present invention has been described with the image segment and the search range having a particular form, the image segment and the search range may be of any shape or size such as in the case for which the image segment and the search range is constructed in accordance with the shapes and sizes of the objects. Furthermore, the comparison of a segment from the present frame may be made with immediately previous frame or immediately future frame as well as previous or future frames separated from the present frame by more than one frame in time. Furthermore, the comparison may be made to any combination of above mentioned frames such as B-frame used in the MPEG systems in which more than one adjacent frame are compared.

What is claimed is:

1. A method for comparing an image signal between adjacent frames and estimating a motion of the image, the method comprising the steps of:

constructing a first image segment representing a portion of present image frame and a second image segment having a plurality of image segments of an adjacent frame;

comparing said plurality of image segments of said second image segment with the image signal within the first image segment, and generating a number of error values;

detecting a first motion vector at one scale of resolution using the generated error values;

outputting the error value associated with a reference segment pointed by the first motion vector, and the error values corresponding to the reference segment shifted by one unit of selected resolution respectively in selected direction(s);

generating a second motion vector in finer scale of resolution using the output error values; and summing the first and second motion vectors.

2. The method as claimed in claim 1, wherein said generating step further comprises the sub-steps of:

detecting a component of said second motion vector in a first direction using the error value of said reference image segment and the error values of said surrounding image segments which are positioned in said first direction with respect to a center of said reference image segment; and detecting a component of said second motion vector in a second direction using the error value of said reference image segment and the error values of said surrounding image segments which are positioned in said second direction with respect to the center of said reference image segment.

3. The method as claimed in claim 2 wherein said first direction and said second direction are horizontal direction and vertical direction respectively.

4. The method as claimed in claim 2 wherein said component of said second motion vector in said first direction and said component of said second motion vector in said second direction indicate the location of the image segment corresponding to a minimum error value.

5. The method as claimed in claim 1 wherein said adjacent frame is a previous frame.

6. The method as claimed in claim 5 wherein said previous frame is an immediately previous frame with respect to said present frame.

7. The method as claimed in claim 5 wherein said previous frame is separated a plurality of frames in time from said present frame.

8. The method as claimed in claim 1 wherein said adjacent frame is a future frame.

9. The method as claimed in claim 8 wherein said future frame is an immediately future frame with respect to said present frame.

10. The method as claimed in claim 8 wherein said future frame is separated a plurality of frames in time from said present frame.

11. The method as claimed in claim 1 wherein each of said plurality of image segments of said second image segment has a segment size equal to said first image segment.

12. The method as claimed in claim 1 wherein said one scale of resolution is a one pixel-unit and said finer scale of resolution is a half pixel-unit.

13. An apparatus for comparing an image signal between adjacent frames and estimating a motion of the image, the apparatus comprising:

means for receiving the image signal of a present frame and constructing a first image segment;

means for receiving the image signal of an adjacent frame and constructing a second image segment;

search means for receiving the image signal output respectively from the first image segment constructor and the second image segment constructor, detecting a first motion vector at one selected scale of resolution units, determining a reference segment within said second image segment in accordance with said first motion vector, comparing the image signals of surrounding image segments, which are generated by moving the reference image segment in selected direction(s) by one unit of the selected scale respectively, and the reference image segment, with the image signal of the first image, and outputting error values obtained as a result of respective comparisons;

control means for receiving the errors output from the search means and generating a second motion vector at a finer scale of resolution than the selected scale; and summing means receiving the first and second motion vectors, for adding and outputting them.

14. The apparatus as claimed in claim 13, wherein said control means further comprises:

a first controller for comparing said error value of said reference image segment with the error values of said surrounding image segments which are positioned in a first direction with respect to a center of said reference image segment and detecting a vector component in said first direction of said second motion vector; and a second controller for comparing said error value of said reference image segment with the respective error values of said surrounding image segments which are positioned in a second direction with respect to the center of said reference image segment and detecting a vector component in said second direction of said second motion vector.

15. The apparatus as claimed in claim 14 wherein said first direction and said second direction are horizontal direction and vertical direction respectively.

16. The apparatus as claimed in claim 14, wherein said controller further comprises:

a first subtracter for subtracting the error value corresponding to said reference image segment from the error values corresponding to said surrounding image segments which are located to one side of said reference image segment;

a second subtracter for subtracting the error value corresponding to said reference image segment from the error values corresponding to said surrounding image segments which are located to the other side of said reference image segment;

a first multiplier for multiplying a respective first output signal of said second subtracter by a predetermined coefficient, and producing a first multiplied value;

a second multiplier for multiplying a respective second output signal of said first subtracter by said predetermined coefficient, and producing a second multiplied value;

a first comparator, receiving said second output signal and said first multiplied value, for comparing respective magnitudes of the received first comparator inputs, thereby providing a first binary signal as a comparison result;

a second comparator, receiving said first output signal and said second multiplied value, for comparing the respective magnitudes of the received second comparator inputs, thereby providing a second binary signal as a comparison result; and a NOR gate, receiving said first and second binary signals from said first and said second comparators, respectively, for performing a logical NOR function, thereby producing an operated value indicative of said second motion vector.

17. The apparatus as claimed in claim 13 wherein said adjacent frame is a previous frame.

18. The apparatus as claimed in claim 17 wherein said previous frame is an immediately previous frame with respect to said present frame.

19. The apparatus as claimed in claim 17 wherein said previous frame is separated a plurality of frames in time from said present frame.

20. The apparatus as claimed in claim 13 wherein said adjacent frame is a future frame.

21. The apparatus as claimed in claim 20 wherein said future frame is an immediately future frame with respect to said present frame.

22. The apparatus as claimed in claim 20 wherein said future frame is separated a plurality of frames in time from said present frame.

23. The apparatus as claimed in claim 13 wherein said second image segment has a plurality of image segments.

24. The apparatus as claimed in claim 23 wherein each of said plurality of image segments of said second image segment has a segment size equal to said first image segment.

25. The apparatus as claimed in claim 13 wherein said one scale of resolution is a one pixel-unit and said finer scale of resolution is a half pixel-unit.

* * * * *